US008447309B2

(12) United States Patent
Bailey et al.

(10) Patent No.: US 8,447,309 B2
(45) Date of Patent: May 21, 2013

(54) INTELLIGENT ROUTING OF COMMUNICATIONS TO AN INTERNATIONAL NUMBER IN A MESSAGING SERVICE

(75) Inventors: Matthew James Bailey, Seattle, WA (US); Christopher Bryant, Duvall, WA (US); William Rosenberg, Austin, TX (US)

(73) Assignee: AT&T Mobility II LLC, Atlanta, GA (US)

( * ) Notice: Subject to any disclaimer, the term of this patent is extended or adjusted under 35 U.S.C. 154(b) by 673 days.

(21) Appl. No.: 12/634,201

(22) Filed: Dec. 9, 2009

(65) Prior Publication Data
US 2011/0136492 A1    Jun. 9, 2011

(51) Int. Cl.
*H04W 40/00*      (2009.01)
*H04W 4/00*      (2009.01)

(52) U.S. Cl.
USPC .......................................... 455/445; 455/466

(58) Field of Classification Search
USPC ................................................ 455/445, 466
See application file for complete search history.

(56) References Cited

U.S. PATENT DOCUMENTS

| 2002/0137530 | A1 | 9/2002 | Karve |
| 2004/0057403 | A1 | 3/2004 | Jerbi et al. |
| 2007/0275738 | A1 | 11/2007 | Hewes et al. |
| 2009/0061825 | A1* | 3/2009 | Neelakantan et al. ..... 455/412.1 |
| 2009/0111492 | A1 | 4/2009 | Dudley et al. |
| 2009/0203390 | A1 | 8/2009 | Bradbury et al. |
| 2009/0316692 | A1 | 12/2009 | Trapp et al. |
| 2011/0070890 | A1* | 3/2011 | Wu ............................... 455/445 |

FOREIGN PATENT DOCUMENTS
KR    2006110852 A   *   10/2006

OTHER PUBLICATIONS

OA dated Mar. 27, 2012 for U.S. Appl. No. 12/633,492, 24 pages.
"What is a Common Short Code (CSC)?", © 2009 CTIA—The Wireless Association®, 4 pages.
OA dated Sep. 10, 2012 for U.S. Appl. No. 12/633,492, 19 pages.

* cited by examiner

*Primary Examiner* — Kamran Afshar
*Assistant Examiner* — Omoniyi Obayanju
(74) *Attorney, Agent, or Firm* — Turocy & Watson, LLP

(57) ABSTRACT

System(s) and method(s) are provided for intelligent routing of communication(s) to international number(s) in a messaging service. To route a communication that includes an international number, format of the communication is established. A text-only communication is delivered through a messaging service transport protocol (MSTP) suitable for text. A media-based communication intended for a plurality of recipients, e.g., a group message, is ungrouped, the international number is identified, and a new message is generated for a group of recipients that excludes a recipient associated with the international number. The new message is delivered through a MSTP suitable for media, whereas an exception handling procedure is conducted for the international number. In addition, to route the communication that includes an international number, network interoperability of predetermined MSTP can be assessed. The communication is delivered through the predetermined MSTP if it is interoperable. Conversely, the communication is routed as a media-based group message.

18 Claims, 10 Drawing Sheets

INTELLIGENT ROUTING OF COMMUNICATIONS TO AN INTERNATIONAL NUMBER IN A MESSAGING SERVICE

TECHNICAL FIELD

The subject disclosure relates generally to communication networks and, more specifically, to intelligent routing of media-based and text-based communications in messaging service(s).

BACKGROUND

Mature messaging service transport protocols, such as the Short Message Service (SMS) protocol, display nearly ubiquitous interoperability amongst various telecommunication marketplaces including foreign, or global, marketplaces. Besides technology maturity, the SMS protocol is not only largely employed for instant messaging (IM) of text content amongst subscribers, but it is also heavily exploited as a signaling mechanism for exchange of control data amongst various network components, which further promotes pervasive interoperability. In contrast, messaging service transport protocols, such as the Multimedia Messaging Service (MMS) protocol, which are based on more recent communication standards, particularly for telecommunication, have rather limited interoperability, especially amongst local, or domestic, and global marketplaces. As mobile communications expand globally because of at least pursuit of market share development by network operators and increased subscriber mobility, such disparity in interoperability amongst marketplaces can be detrimental to advanced messaging services that exploit or are planned to exploit advanced messaging service transport protocols that enable rich, multimedia-intensive messaging services. Accordingly, routing of communication(s) in an advanced messaging service with inadequate interoperability amongst marketplaces at either local or global scale may result in diminished perceived quality of service from subscribers, with the ensuing risk of subscriber attrition or underdeveloped revenue for such advanced messaging service offerings.

SUMMARY

The following presents a simplified summary of the subject disclosure in order to provide a basic understanding of some aspects thereof. This summary is not an extensive overview of the subject disclosure. It is intended to neither identify key or critical elements nor delineate any scope. Its sole purpose is to present some concepts of the various embodiments of the subject disclosure in a simplified form as a prelude to the more detailed description that is presented later.

One or more embodiments provide intelligent routing of media-based or text-based communications that are part of messaging service(s). For a communication within the messaging service(s), or messaging service (MS) communication, which includes an international number as part of a set of addresses of intended recipients of the MS communication, at least one of a content-based mechanism or an interoperability-based mechanism is exploited to route the MS communication. In the content-based mechanism, a format of the MS communication is established. If the MS communication is a text-only message, then the MS communication is delivered through a messaging service transport protocol dedicated to text delivery, such as SMS protocol or Simple Mail Transfer Protocol (SMTP). When the text-only message is intended for a plurality of recipients, e.g., the MS communication is a group message, the MS communication is ungrouped prior to delivery. In case the MS communication is a media-based message intended for a plurality of recipients, the MS communication is ungrouped, the international number is identified, and a new message is generated and directed to a group of recipients that excludes a recipient associated with the international number. The new message is delivered through a messaging service transport protocol for media content, such as MMS or Session Initiation Protocol (SIP) for Instant Messaging and Presence Leveraging Extensions (SIMPLE), whereas an exception handling procedure is conducted for the international number. Such a procedure can include delivering status notification(s) directed to equipment that originates the communication that includes the international number or to equipment linked to the recipient associated with the international number; either equipment can render the status notification(s) through visual or aural indicia.

In the interoperability-based mechanism, for network operator(s) associated with the international number, interoperability of a predetermined messaging service transport protocol is assessed. The assessment can be based at least on accessed interoperability data available to a network operator that administers the messaging service(s). If such protocol is interoperable, the communication is delivered through the messaging service transport protocol for media content, otherwise the communication that includes the international number is processed in substantially the same fashion as in the content-based mechanism.

While various aspects or features of the subject disclosure are illustrated with MMS protocol and SMS protocol as messaging transport protocols, the subject disclosure is not so limited and it can be advantageously exploited for two or more messaging service transport protocols with disparate interoperability characteristics.

Aspects, features, or advantages of the subject disclosure can be exploited in substantially any, or any, wireless telecommunication or radio technology or network combined with a platform for packet-based services. Non-limiting examples of such technologies or networks include Femtocell technology, Wi-Fi, Worldwide Interoperability for Microwave Access (WiMAX); Enhanced General Packet Radio Service (Enhanced GPRS); Third Generation Partnership Project (3GPP) Long Term Evolution (LTE); 3GPP Universal Mobile Telecommunications System (UMTS); Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); Global System for Mobile Communication (GSM) Enhanced Data Rate for GSM Evolution (EDGE) RAN or GERAN; UMTS Terrestrial Radio Access Network (UTRAN); or LTE Advanced.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention may be employed. Other aspects, advantages and novel features of the invention will become apparent from the following detailed description of the invention when considered in conjunction with the drawings.

DETAILED DESCRIPTION

Figure 1:
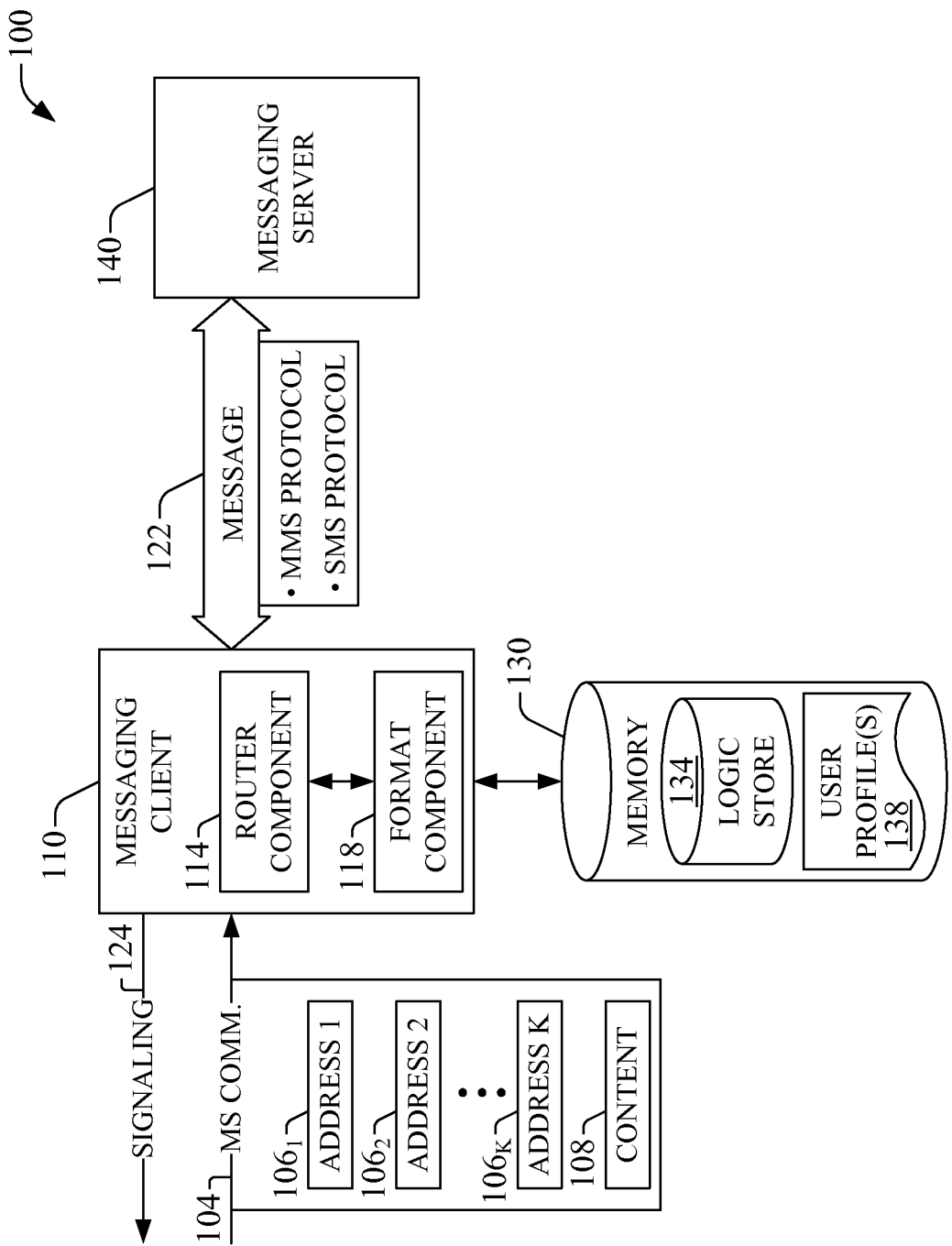
FIGS. 1-3 display block diagrams of an example systems that enable intelligent routing of a messaging service communication in accordance with aspects described herein.

The subject disclosure is now described with reference to the drawings, wherein like reference numerals are used to refer to like elements throughout. In the following description, for purposes of explanation, numerous specific details are set forth in order to provide a thorough understanding of the various embodiments of the subject disclosure. It may be evident, however, that the subject disclosure may be practiced without these specific details. In other instances, well-known structures and devices are shown in block diagram form in order to facilitate describing the various embodiments of the subject disclosure.

As used in this application, the terms "component," "system," "platform," "layer," "node," "interface," "selector," and the like are intended to refer to a computer-related entity or an entity related to an operational apparatus with one or more specific functionalities, wherein the computer-related entity and the entity related to the operational apparatus can be entity can be either hardware, a combination of hardware and software, software, or software in execution. One or more of such computer-related entities or entities related to the operational apparatus are also referred to herein as "functional elements." As an example, a component may be, but is not limited to being, a process running on a processor, a processor, an object, an executable, a thread of execution, a program, and/or a computer. By way of illustration, both an application running on a server or network controller, and the server or network controller can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software, or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, layer, node, interface, selector, and the like.

Various aspects of the subject disclosure are presented in terms of systems or embodiments that may include a number of components, modules, nodes, interfaces, platforms, or the like. It is to be understood and appreciated that the various systems or embodiments may include additional components, modules, etc. and/or may not include all of the components, modules, nodes, interfaces, platforms, etc. discussed in connection with the annexed drawings. A combination of these approaches may also be used.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "Node B," "evolved Node B (eNode B)," and the like, are utilized interchangeably in the subject disclosure, and refer to a wireless network component or apparatus that at least delivers and receives data, control, voice, video, sound, gaming, or substantially any or any data stream or signaling stream. Sources or recipients of such data, control, voice, video, sound, gaming, or substantially any or any data stream or signaling stream can be at least a set of network components such as, but not limited to, user equipment, customer premises equipment, or network servers, controllers, gateways or management components. Data and signaling streams can be packetized or frame-based flows or circuit-switched streams of information.

Furthermore, the terms "recipient," "user," "subscriber," "customer," "consumer," "prosumer," "agent," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms) which can provide simulated vision, sound recognition and so forth. When utilized, the term "prosumer" indicates the following contractions: professional-consumer and producer-consumer.

Further yet, the term "set" as employed herein excludes the empty set. Thus, a "set" in the subject disclosure includes one or more elements or entities. As an illustration, a set of devices includes one or more devices, a set of recipients includes one or more recipients, a set of addresses can include K addresses with K a natural number greater than or equal to unity.

As described in greater detail below, one or more embodiment of the subject disclosure enable intelligent routing of communication(s) to international number(s) in a messaging service. To route a communication that includes an international number, format of the communication is established. A text-only communication is delivered through a messaging service transport protocol (MSTP) suitable for text. A media-based communication intended for a plurality of recipients, e.g., a group message, is ungrouped, the international number is identified, and a new message is generated for a group of recipients that excludes a recipient associated with the international number. The new message is delivered through a MSTP suitable for media, whereas an exception handling procedure is conducted for the international number. In addition, to route the communication that includes an international number, network interoperability of predetermined MSTP can be assessed. The communication is delivered through the predetermined MSTP if it is interoperable. Conversely, the communication is routed as a media-based group message.

With reference to the drawings, FIG. 1 is a block diagram of an example system 100 that enables intelligent routing of a messaging service communication in accordance with aspects described herein. The subject example system includes a messaging client component 110, also termed herein and annexed drawings messaging client 110, that receives a messaging service (MS) communication 104 comprising a set of addresses $106_1$-$106_K$, with K a natural number greater or equal than unity, and content 108, which can include at least one of text-only content or multimedia content. In an aspect, MS communication 104 can be generated through a device or customer premises equipment (CPE), which can be mobile or non-mobile and includes messaging client component 110. Each address $106_\kappa$, with κ=1, 2 ... K, can identify a device, mobile or otherwise, associated with a recipient of MS communication 104. In an aspect, for K>1, MS communication 104 is a group message, and device(s) associated with respective recipient(s) of MS communication 104 can render presence information related to the set of recipients that receives the MS communication 104; in such device(s), the presence information can be rendered through visual or aural indicia. In addition, each address can be at least one of an email address; an IP address; a server name; an integrated circuit card identification (ICCID) serial number; or a mobile subscriber integrated services digital network (MSISDN), a mobile identification number (MIN), or a telephone number in accordance with E.164 plan, North American Numbering Plan (NANP), other numbering plan(s), or dialing plan(s). One or more addresses in the set of addresses $106_1$-$106_K$ can include an international destination address, or international destination.

In an aspect, messaging client 110 receives MS communication 104 via router component 114, which can be configured to deliver a group message in accordance with a predetermined messaging service transport protocol, also referred to as predetermined transport protocol. Such predetermined transport protocol can be one of various messaging protocols that enable delivery of visual or aural indicia: For example, MMS protocol, Instant Messaging and Presence Service (IMPS) protocol, SIMPLE, Extensible Messaging and Presence Protocol (XMPP), SMTP, or the like. Router component 114 also can deliver non-group message(s) intended for a single recipient; in such scenario, router component 114 can be configured to deliver the non-group message, e.g., K=1, through one of various messaging service transport protocols, or transport protocols, such as SMS protocol, MMS protocol, SIMPLE, XMPP, IMPS protocol, SMTP, or the like. For an MS communication, or message, received within a messaging service, router component 114 can determine if the communication is a non-group message and deliver the communication in accordance with a provisioned transport protocol for non-group messages.

Figure 2:
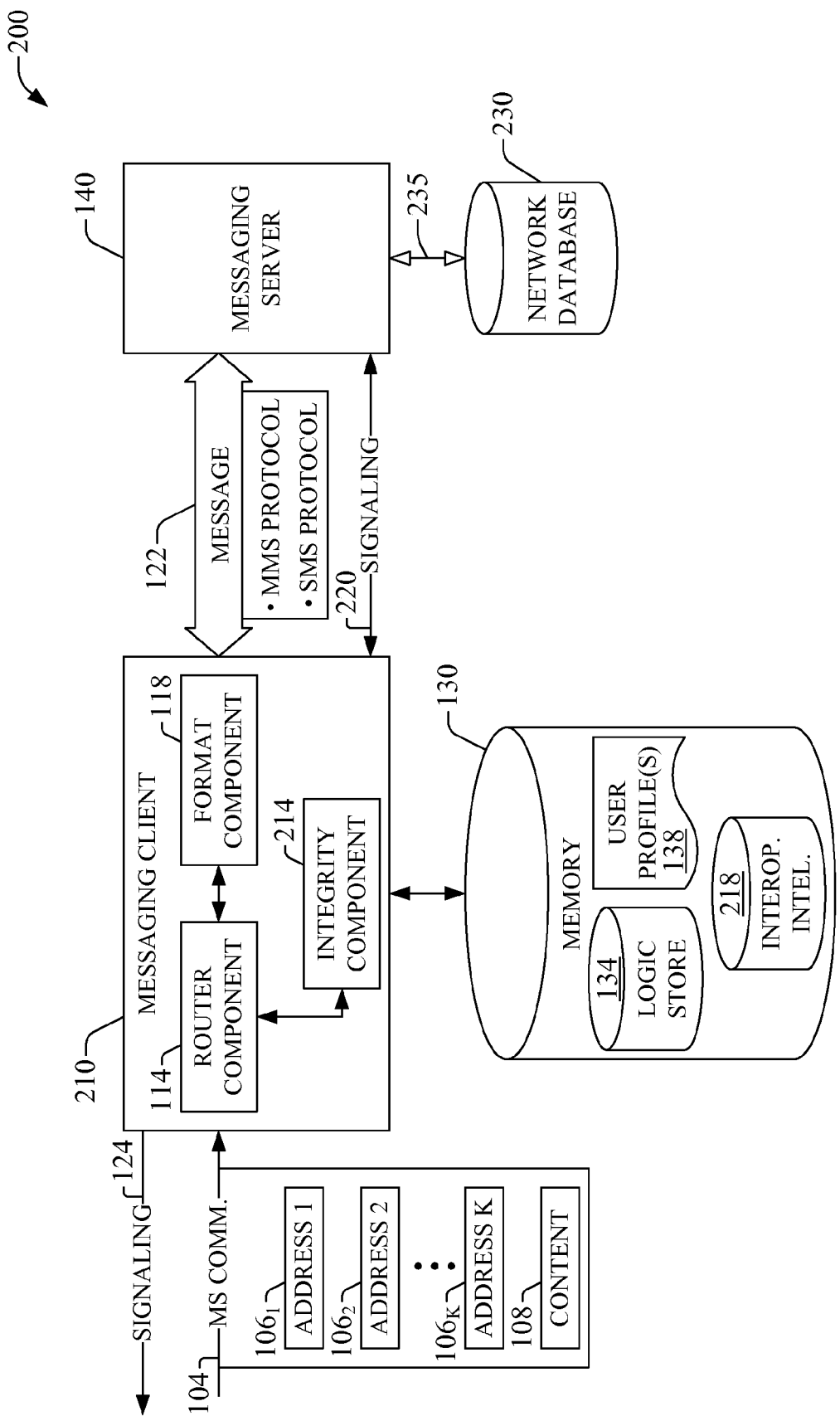

In an aspect of the subject disclosure, to deliver a received message, e.g., MS communication 104, to a messaging server, e.g., 140, router component 114 utilizes logic based in part on address(es), e.g., $106_1$-$106_K$, of intended recipient(s) in the received message. In one or more scenarios, as described hereinafter, router component 114 can deliver a processed version of the incoming message; either the received message or the processed version thereof is represented as message 122 in FIGS. 1-2. Router component 114 can deliver at least one of the received message or the processed version thereof through a wireless link or wired link in accordance with one or more transport protocols, as illustrated with MMS protocol and SMS protocol in FIGS. 1-2.

The logic to deliver the received message is retained in logic store 134 within memory 130 and includes a set of rules for identifying an international destination in a received message and processing the received message that includes the international destination. Logic retained in logic store 134 can be supplied by a network management component (not shown) at a time a device or customer premises equipment (CPE) that includes messaging client 110 is provisioned for messaging service(s). Such logic can be embodied in code instructions and, in an aspect, it can be retained in logic store 134 as a static or dynamic linkable library. To identify an international destination, router component 114 can apply a rule in the set or rules that tags an address in the received message (e.g., MS communication 104) that represents a device number that, according to a dialing plan, begins with "011n" or with "+n", with n an alphanumeric digit different than "1". In aspect, an address (e.g., $106_2$) that is identified as an international destination and is available in an address book or user profile(s), e.g., 138, can be flagged to associate an alias, e.g., contact name or nickname, linked with the address with the international destination, and thus reduce processing related to application of the rule when the alias is present in further messaging service session(s). If the address identified as an international destination is not available in the address book or user profile(s), e.g., 138, a notification can be rendered in a device, mobile or otherwise, that hosts the messaging client component, e.g., 110, to prompt a request to include the address in the address book or user profile, e.g., 138. The notification can be conveyed to a display interface (not shown) as part of signaling 124.

For an MS communication 104 that does not include an address identified as an international destination, a rule within logic store 134, when applied, or executed, by router component 114, for example, can direct router component 114 to deliver the message in accordance with a configured messaging transport protocol, e.g., MMS protocol, SIMPLE, XMPP, or the like. The configured MS transport protocol can be established by a network operator and is re-configurable based in part on events such as network upgrades, adoption of new radio technology standards, or the like. In the alternative, for an identified international destination in a set of addresses of intended recipients, logic retained in logic store 134, can include rule(s) that when applied, or executed, e.g., by router component 114, can direct router component 114 to implement an exception handling procedure to route the MS communication 104.

Router component 114 can implement, or execute, various exception handling procedures to route a received message, e.g., MS communication 104, that includes an international destination. Implementation or execution of such exception handling procedures can be part of logic, e.g., retained in logic store 134, to route a received MS communication. In an aspect, exception handling procedures can include a content-based procedure or an interoperability-based procedure; such procedures can be implemented separately or in combination. Content-based exception handling procedure.—In the subject exception handling procedure, router component 114 can convey the received message that includes an international destination to a format component 118 that can determine format of content, e.g., 108, conveyed in the received message and supply an indication of the format to router component 118. In a scenario in which the received message carries text-only content, router component 118 can route the received message via a transport protocol for text delivery, e.g., SMS protocol or SMTP; a network operator can configure such transport protocol based in part on available interoperability amongst domestic and international carriers. In view of maturity of SMS protocol, interoperability is substantial and thus it can be a suitable transfer protocol for text-only delivery. In an aspect, in case the received message that carries text-only content is a non-group message, e.g., K=1 in MS communication 104, router component 118 can deliver the non-group message without further processing. However, if the received message is a group message, e.g., K>1 in MS communication 104, router component 118 can signal format component 118 to ungroup the group message and return a plurality of two or more messages, which can be delivered in point-to-point fashion by router component 118 via the configured protocol for text-only delivery, e.g., SMS protocol or SMTP.

If the content of the received message is not text-only, router component 118 can direct format component 118 to ungroup the received message and identify one or more recipients associated with respective one or more international destinations. To at least such end, format component 118 can apply the rule in logic store 134 that allows identification of addresses included in the received message; if one or more of such address(es) is(are) tagged address(es) as discussed supra, format component 118 can bypass application of such rule. After identification of the one or more recipients associated with international destination(s), format component 118 can compose a new group message for a set of recipients that includes a portion of the originally intended recipients for the received message and excludes the one or more recipients associated with international destination(s). Router component 118 can collect the new group message and deliver it in accordance with a predetermined transport protocol for delivery of group messages, e.g., MMS protocol. In addition, router component 118 can effect an exception handling procedure for the identified international destination(s). In an aspect, as part of such exception handling procedure, router component 118 can notify a device that originates the received message that includes international destination(s) that such international destination(s) are unreachable. Other error or status messages also can be delivered. In another aspect, router component 118 can deliver remediation message(s) as part of the notification to the device, wherein a recommendation for alternative communication mechanisms can be conveyed. The notification can be conveyed as part of signaling 124. Moreover, router component 118 can deliver a status message to the one or more recipients associated with international destination(s) via a transport protocol different from the predetermined transport protocol for delivery of a group message. Such status message can be conveyed through SMS protocol and can provide at least one of an indication that a group message intended for the international destination failed or a list of recipients for the group message intended for the international destination.

Interoperability-based exception handling procedure.— Implementation of the subject exception handling procedure can require added complexity in a messaging client component that manages, at least in part, a messaging service. As illustrated in example system 200, represented in FIG. 2, messaging client component 210, also termed herein and annexed drawings messaging client 210, can include integrity component 214 that can access network data on network interoperability from messaging server 140, for example, via signaling 220, and can supply such network data to router platform 118, which can exploit such information to route the received message that includes one or more international destination(s). Integrity component 214 can utilize various mechanisms to access the network data on network interoperability, or interoperability information. As an example, integrity component 214 can pull interoperability information from a network database 230 via messaging server 140. In an aspect, network database 230 can be embodied in one or more of a Home Subscriber Server (HSS), a Home Location Register (HLR), a Visited Location Register (VLR), a back-end service database. Network database 230 can be functionally connected to messaging server through interface 235, which can include at least one of a conventional wired link, a wireless link, or a reference link and associated component (s). As another example, network database 230, or a manager component thereof, can push the network data in interoperability towards integrity component 214. The network data on interoperability can be accessed at predetermined intervals or based on events such as updates to a network that administers a messaging server that exploits messaging server 140. The accessed network data on interoperability can be retained in interoperability intelligence store 218, or interoperability intelligence 218, within memory 130, which is functionally coupled to messaging client component 110.

Based at least on available interoperability information, for network operator(s) or a marketplace associated with at least one international destination in a received message, e.g., MS communication 104, router component 114 can determine interoperability of a predetermined transport protocol provisioned to deliver group message(s). If the predetermined transport protocol (e.g., MMS protocol, SIMPLE, XMPP) is interoperable, the group message that includes the at least one international destination can be delivered in accordance with the predetermined transport protocol. In the alternative, if router component 114 establishes that the predetermined protocol transport is not interoperable and the received message is a group message, router component 114 can direct format component 118 to ungroup the group message, identify one or more recipients associated with the at least one international destination, and generate a new group message for a set of recipients that exclude the one or more recipients associated with the at least on international destination. As described supra, router component 114 can collect the new group message and deliver it in accordance with the predetermined transport protocol. In addition, router component 114 can implement an exception handling procedure for the at least one international destination as described supra.

For a message, e.g., MS communication 104, that includes at least one international destination, router component 114 also can exploit interoperability information to signal format component 118 to pack the message, which can be received in a first protocol transport that is not interoperable with network operator(s) associated with the international destination, into a second transport protocol that is interoperable with the network operator(s). Format component 118 can pack, or reformat, the received message automatically, through extraction of the message's content, e.g., content 108, and address(es), e.g., $106_1$-$106_K$, and generation of a new message in the second transport protocol. In an aspect, to reformat the received message from the first transport protocol to the second transport protocol, can execute a set of code instructions retained in memory (e.g., 130) accessible to format component 118.

In an aspect, similarly to messaging server 140, messaging server 320 can be embodied in a gateway node (e.g., Gateway GPRS Support Node (GGSN)), a network management component (e.g., Serving GPRS Support Node (SGSN), Mobility Management Entity (MME)), a Session Border Control (SBC) node, an application server, or the like.

Figure 3:
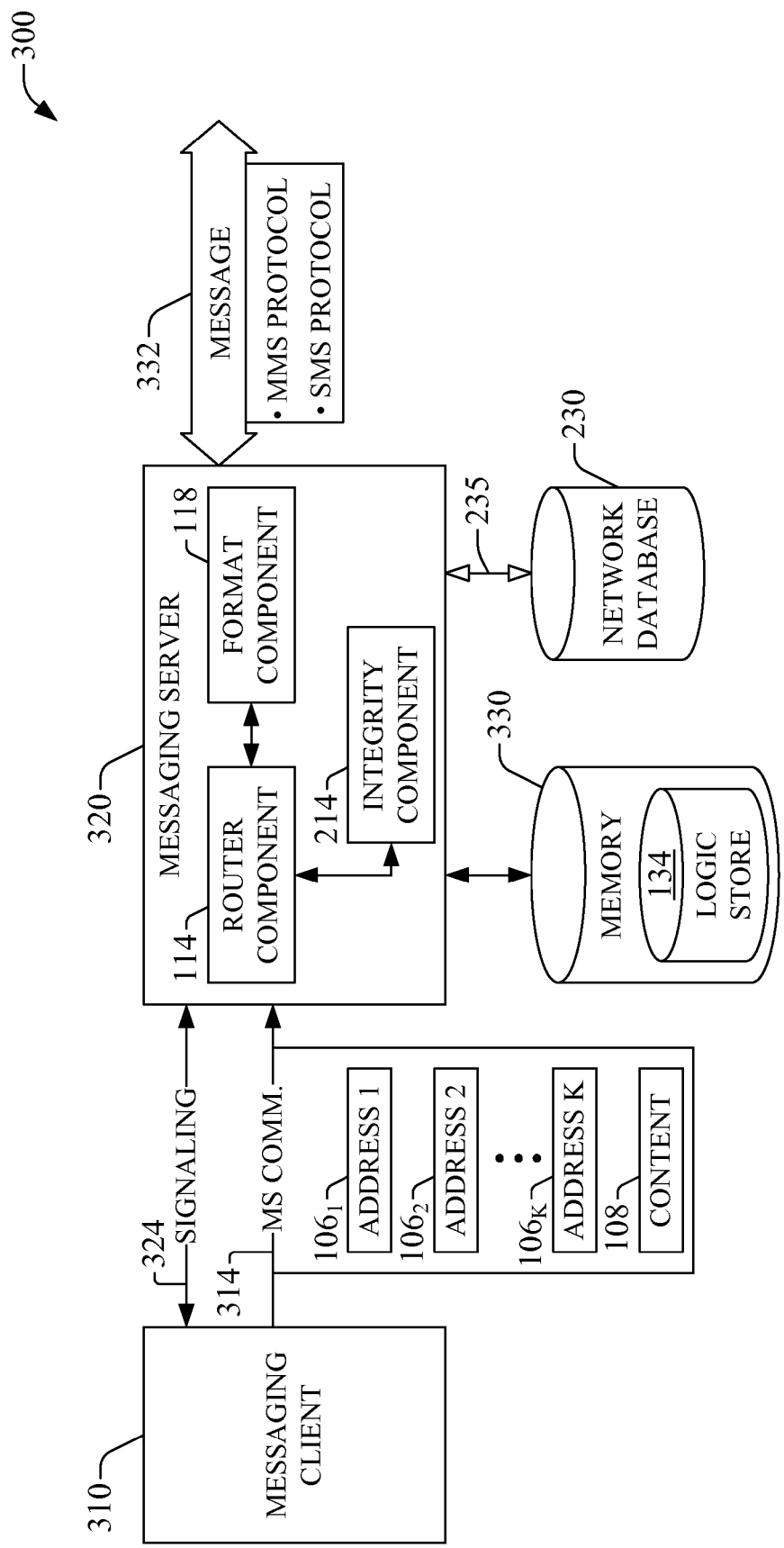

FIG. 3 is a block diagram of an example system 300 that enables intelligent routing of a messaging service communication in accordance with aspects described herein. In the subject example system 300, intelligent routing is accomplished at the network level: The sub-system comprising router component 114, format component 118, integrity component 214 are deployed within a messaging server 320, which is functionally coupled to a memory 330 that hosts logic store 134 and to network database 230. As discussed supra, messaging server 320 can be embodied in a gateway node (e.g., GGSN), a network management component (e.g., SGSN, MME), an SBC node, an application server, or the like. In an aspect, MS communication 314 is received from messaging client component 310, also termed herein and annexed drawings messaging client 310, and can be received in substantially any messaging transport protocol, such as MMS protocol, SIMPLE protocol, IMPS protocol, XMPP, or the like. Router component 118 can receive MS communication 314 and can process it as described supra, trough format component 114 and integrity component 214, in order to accomplish intelligent routing of MS communication 314 based on content-based exception handling procedure(s) or interoperability-based exception handling procedure(s). After MS communication 314 is processed, messaging server 320 can deliver, via router component 118, for example, a message 332 based in part on the incoming MS communication 314. Delivery can be effected in accordance with a messaging service transport protocol determined in accordance with aspects described supra; the message 332 can be conveyed, at least in part via a reference link that connects messaging server with a gateway or other network component(s) that enables interoperability with domestic or foreign network operators. Notification(s) or other control message(s) can be conveyed to messaging client 310 through signaling 324.

The logic to deliver a MS communication described herein provides a messaging client (e.g., 110, 210) or messaging server (e.g., 320) with intelligent routing. At least one advantage of such intelligent routing is that interoperability aspects of messaging service transport protocol(s) are accounted for as part of routing or delivery of MS communication(s); thus, routing or delivery of the MS communication(s) to international destinations becomes robust and more accurate compared to conventional messaging services. Accordingly, routing or delivery robustness and correctness mitigates issues such as billing inaccuracies due to, for example, undeliverable data that is recorded as consumed data—an issue that can affect particularly subscriber(s) without a data plan—and thus can promote a positive end-user perceived quality of service with respect to the network operator that administers the messaging service.

Figure 4:
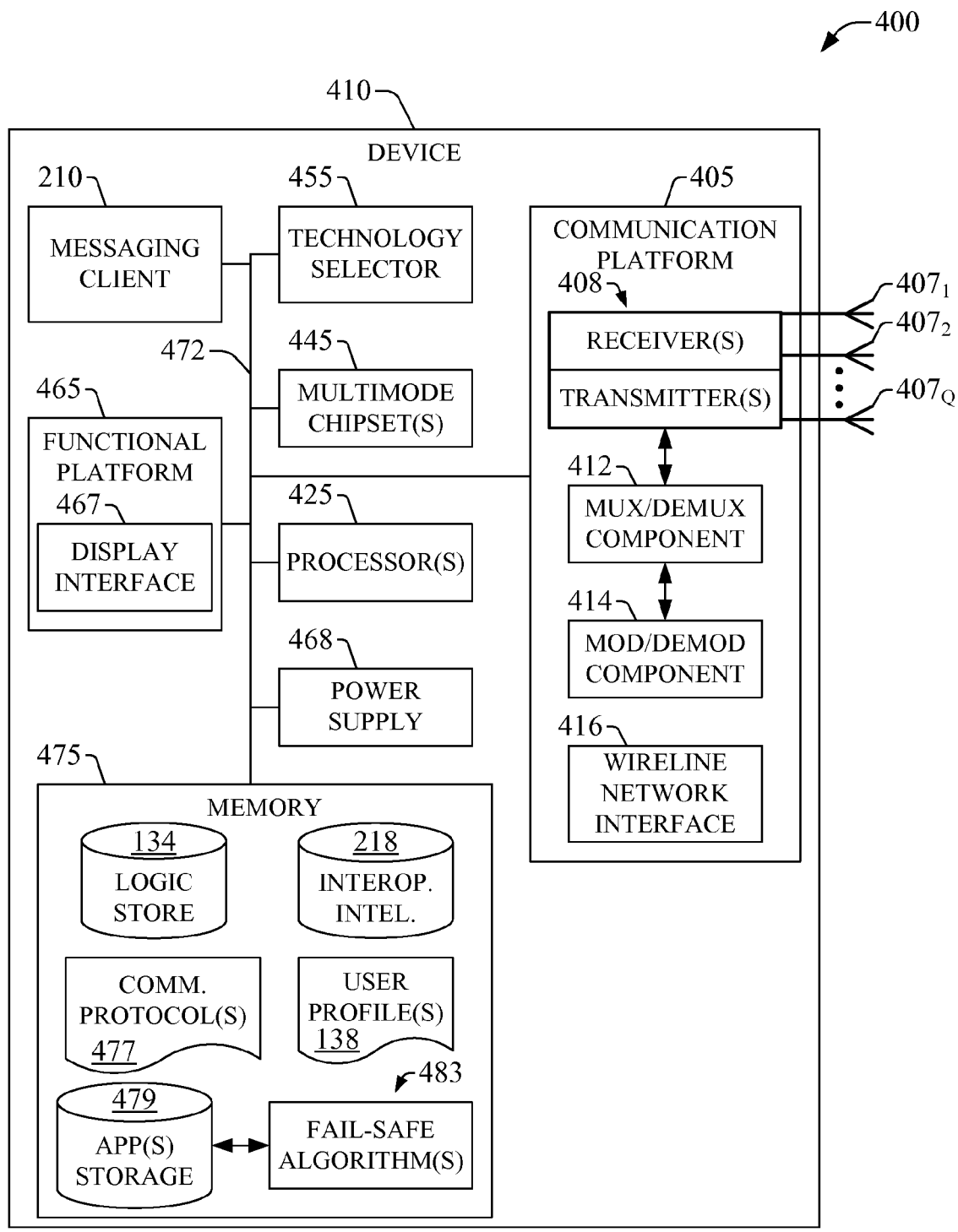
FIG. 4 is a block diagram of an embodiment of a device that can exploit a messaging client component in accordance with aspects described herein.

FIG. 4 is a block diagram of an embodiment 400 of a device that can exploit a messaging client component in accordance with aspects described herein. While in the subject example embodiment the messaging client is illustrated within a device, it should be appreciated that the messaging component also can reside in most any customer premises equipment (CPE). In device 410, which can operate in multi-technology multimode, a set of antennas $407_1$-$407_Q$ (Q is a positive integer) can receive and transmit signal(s) from and to wireless devices such as base stations, access terminals, wireless ports and routers, and so forth, that operate in a radio access network. It should be appreciated that antennas $407_1$-$407_Q$ are a part of communication platform 405, which comprises electronic components and associated circuitry that provide for processing and manipulation of received signal(s) and signal(s) to be transmitted.

Communication platform 405 includes receiver(s)/transmitter(s) 408 that can convert signal from analog to digital upon reception, and from digital to analog upon transmission. In addition, receiver(s)/transmitter(s) 408 can divide a single data stream into multiple, parallel data streams, or perform the reciprocal operation; such operations typically conducted in various multiplexing schemes. Functionally coupled to receiver(s)/transmitter(s) 408 is a multiplexer/demultiplexer (mux/demux) component 412 that facilitates manipulation of signal in time and frequency space. Electronic mux/demux component 412 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 412 can scramble and spread information (e.g., codes) according to substantially any code; e.g., Hadamard-Walsh codes, Baker codes, Kasami codes, polyphase codes, and so on. A modulator/demodulator (mod/demod) component 414 is also a part of communication platform 405, and can modulate information according to various modulation techniques, such as frequency modulation (e.g., frequency-shift keying), amplitude modulation (e.g., M-ary quadrature amplitude modulation (QAM), with M a positive integer; amplitude-shift keying (ASK)), phase-shift keying (PSK), and the like. In an aspect of embodiment 400, mod/demod component 414 is functionally coupled to mux/demux component 412. Processor(s) 425 allows, at least in part, device 410 to process data (e.g., symbols, bits, or chips) for multiplexing/demultiplexing; modulation/demodulation, such as implementing direct and inverse fast Fourier transforms; selection of modulation rates, selection of data packet formats, or inter-packet times; and other conventional operations that enable wireless communication Additionally, communication platform 405 can include a wireline network interface 416 that enables communication of data and signaling through a wired network, such as a broadband network, a cable network, a conventional Public Switched Telephone Network (PSTN), or circuit switched (CS) networks. In an aspect, device 410 can receive wireless data or signaling through receiver(s)/transmitter(s) 408 and relay such data or signaling via wireline network interface 416. Alternatively or additionally, device 410 can implement communication solely via wireline network interface 416, as it can be the case when device 410 effects a communication such as a voice over IP (VoIP) call session. In an aspect, wireline network interface 416 can afford functional connection and communication with one or more access nodes (not shown) functionally coupled to a packet-based core network, e.g., IP Multimedia Subsystem (IMS) network.

In embodiment 400, multimode operation chipset(s) 445, also termed herein multimode chipset(s) 445, can allow device 410 to operate in multiple communication modes through (i) various radio network technologies (e.g., Second Generation (2G) technology such as GSM, Third Generation (3G) technology of which 3GPP UMTS is an example, Fourth Generation (4G) such as LTE Advanced . . . ) in accordance with disparate technical specifications, or standard protocols, for the radio network technologies; and (ii) one or more wired packet-switched (PS)-based or wired CS-based communication mechanisms. In particular, multimode chipset(s) 445 can utilize communication platform 405 in accordance with standard protocols specific to a mode of communication operation; such standard protocols can be retained in communication protocol(s) 477. In another aspect, multimode operation chipset(s) 445 can be scheduled to operate concurrently (e.g., when Q>1) in various modes or within a multitask paradigm; for instance, antennas $407_1$-$407_Q$ can receive voice wirelessly and a data stream for a specification application through wireline network interface 416. Such hybrid mode of operation can be configured, at least in part, through functional platform 465 via processor(s) 425; to at least that end, in an aspect, functional platform 465 can include a session control component (not shown) that can establish voice or data call sessions in accordance with various protocols.

In device 410, technology selector 455 can operate, or drive operation of, multimode chipset(s) 445 through selection of one or more radio network technologies for telecommunication in a specific mode. In an aspect, selection of a radio network technology can be dictated in part by an indication of a selection of a communication service, e.g., voice service or data service such as a messaging service or web browsing. Such indication can be based in part on signaling that conveys a selection of a specific communication service effected through at least one of actuation of a functional element in functional platform 465, provision of input information through a subscriber gesture, or execution of a specific application retained in memory element 479 and interfaced via display interface 467. In an aspect, functional platform 465 can signal technology selector 455 to configure multimode chipset(s) 445 to operate in a specific communication mode that enables the selected communication service.

Device 410 also includes a functional platform 465 that comprises a set of components (not shown) that provide, at least in part, one or more specific functionalities that complement or supplement wireless or wireline communication. As an example, in the case device 410 is a telephone, functional platform 465 can include functional elements such as a data entry interface (e.g., a keyboard, a biometric pad for biometric-based access, a microphone, a loud speaker . . . ), a camera, peripheral connectors (e.g., a Universal Serial Bus (USB) port for transferring data to a disparate device), a voice coder-decoder (vocoder), and so on. Functional platform 465 can exploit application(s) stored in application(s) storage 422 within memory 475 to provide one or more functionalities. In an aspect of the subject innovation, technology selector 455 can exploit one or more driver applications that can be retained in application(s) storage 479 to interface with functional platform 465, via processor(s) 425, to properly realize and execute radio technology and application(s) combinations in device 410.

In addition to delivery of CS-based or PS-based voice traffic, device 410 can convey, through communication platform 405, one or more messages in accordance with a messaging service protocol (e.g., SMS protocol, MMS protocol, SIMPLE, IMPS, XMPP . . . ) that can be retained in communication protocol(s) 477. It is noted that communication protocol(s) 477 also can include protocols such as SMTP, SIP, H.323, or other conventional, standardized protocols for wireless or wireline communication. Communication protocol(s) 477 can be supported, at least in part, through one or more applications retained in memory element 479. In an aspect, messaging client component 210 can establish a messaging service transport protocol in accordance with features described herein.

In an aspect, functional platform 465 can include a display interface 467 that allows subscriber gestures (e.g., speech gestures such as voice command(s), touch gestures, or motion gestures) for subscriber-device interaction to manipulate information rendered by device 410, e.g., collect information from device 410 or input information into device 410. Input of information into device 410 can occur in response to a prompt (e.g., a notification with a request for subscriber intervention) or other indicia (e.g., presence information) rendered in display interface 465. Subscriber gestures, and associated information manipulation, can be accomplished via at least one of a screen (e.g., a liquid crystal display (LCD), a plasma panel, a monolithic thin-film based electrochromic display . . . ); keypad or touchpad; a biometrics reader, such as a fingerprint or iris scanner, a barcode reader or a radio frequency identification (RFID) reader; a sound interface (e.g., a microphone, a loud-speaker); movement sensor(s); or the like. Additionally, display interface 467 can render content(s) that enable at least one of the following. (i) Control functionality of device 410 as provided by functional platform 465, (ii) reveal operation conditions of device 410, or (iii) allow initiation and retention of a call session or a messaging service (e.g., launch of an instant messenger application stored in application(s) storage 479) or selection of a communication service, e.g., messaging service, media exchange, or the like.

Device 410 further includes power supply 468, which can power up components or functional elements within device 410. When device 410 is wireless, power supply 468 can be generally a rechargeable power supply, e.g., a Li-based rechargeable battery, and it can include one or more transformers to achieve power level(s) adequate to operate device 410 and components, functional elements, and related circuitry therein. In an aspect, power supply 468 can attach to a conventional power grid to recharge and ensure device 410 is operational. Moreover, power supply 468 can include an energy conversion component (not shown), such as a solar panel, to provide additional or alternative power resources or enhanced autonomy to device 410. In case device 410 is a pseudo-stationary tethered apparatus, power supply 468 can include an input/output (I/O) interface (not shown) to connect operationally to the conventional power grid and furnish power to device 410.

In an aspect, memory 475 is at least in part a subscriber-specific removable computer-readable or machine-readable storage medium, such as for example a subscriber identity module (SIM) card, which can be relocated between disparate devices that can operate wirelessly capabilities in order to port subscriber profile(s) 138 or other customer-generated data, such as media or text-based content. Memory 475 also retains fail-safe algorithm(s) 483 that facilitate operation of device 410 when radio technologies deemed preferred are not available, or technology selector 455 is faulty or unavailable in a device that can operate wirelessly. In another aspect, fail-safe algorithm(s) 483 can enable operation and wireless communication of device 410 via legacy radio technology layer(s) or through legacy messaging service transport protocols.

Additionally, memory 475 can store data structures (e.g., metadata); code structure(s) (e.g., modules, objects, classes, procedures) or instructions, or substantially any type of software or firmware application(s) that processor(s) 425 can execute to provide functionality associated with substantially any or any component, platform, interface, selector, and so forth, within device 410, in accordance with aspects of the subject innovation. Moreover, memory 475 can also retain (not shown) network or device information such as specifications; code sequences for scrambling, spreading, or blind decoding hypothesis; semi-persistent scheduling parameters; pilot signal(s) (e.g., reference signal(s)); frequency offsets; cell identifiers (IDs); and so on. Furthermore, memory 475 can retain content(s) (e.g., multimedia files, subscriber-generated data); security credentials (e.g., passwords, encryption keys, digital certificates, biometric reference indicators such as voice recordings, iris patterns, fingerprints); hardware identifying tokens such as IMSI, MSISDN, a serial product number such as MEID and the Telecommunications Industry Association (TIA) electronic serial number (ESN); and so forth.

Device 410 also includes processor(s) 425 configured to provide functionality, at least in part, to most any or any component, platform, interface, selector and so forth, within device 410, in accordance with aspects described herein. In embodiment 400, processor(s) 425 is illustrated as external to the various functional elements (e.g., components, interfaces, platforms, selectors . . . ) of device 410; however, processor(s) 425 can be distributed across such various functional elements. In addition, processor(s) 425 is functionally coupled, through bus 472, to memory 475 in order to store and retrieve information such as code instructions, data structures, etc., necessary to operate and/or provide functionality, at least in part, to communication platform 405, messaging client 210, functional platform 465, technology selector 455, multimode chipset(s) 445, or other functional elements of device 410. In an aspect, bus 472 can be embodied in at least one of a memory bus, a system bus, an address bus, a message bus, or any other conduit, protocol, or mechanism for data or information exchange among components that execute a process or are part of execution of a process.

Figure 5:
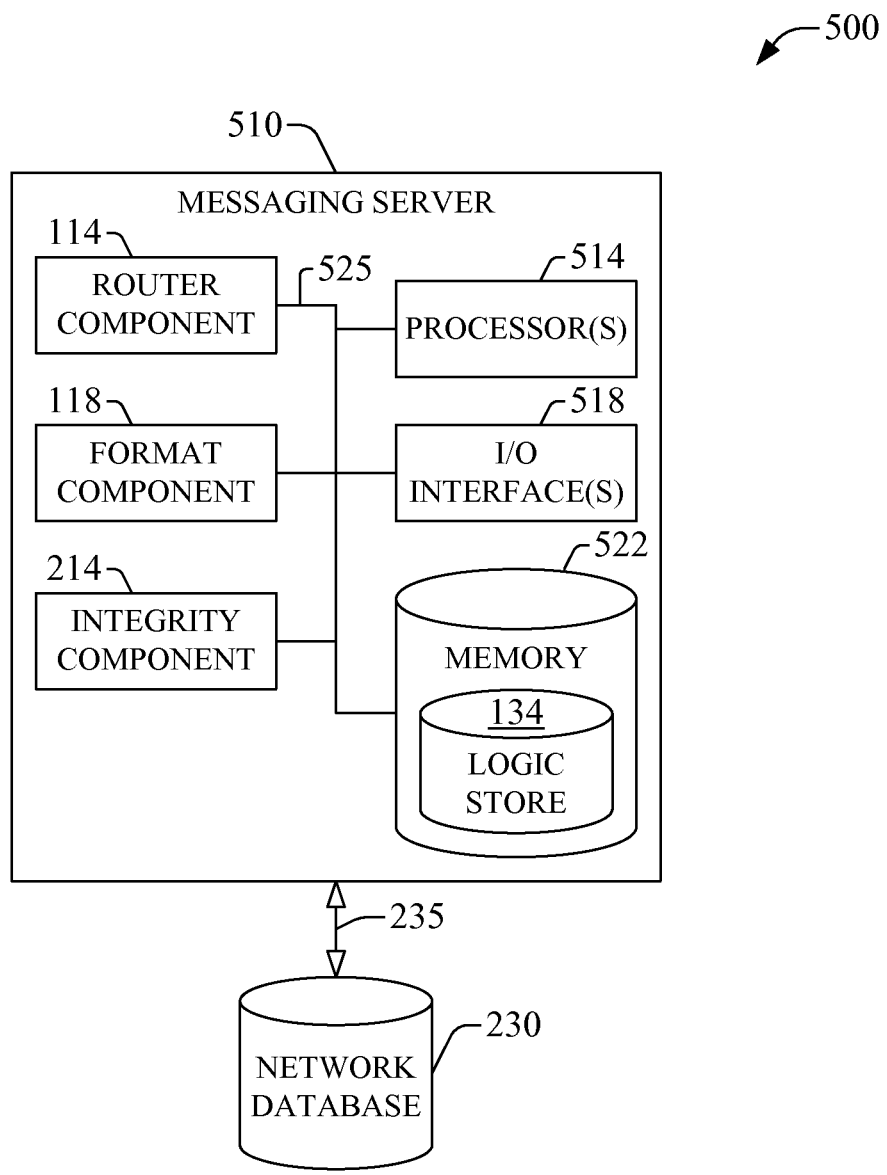
FIG. 5 illustrates an example embodiment of a messaging server in accordance with aspects disclosed herein.

FIG. 5 illustrates an example embodiment 500 of a messaging server in accordance with aspects disclosed herein. The subject example embodiment 500 can be a realization of messaging server 320 or other messaging servers disclosed hererin. In example embodiment 500, router component 114, format component 118, and integrity component 214 operate as described hereinbefore. Processor(s) 514 can be configured to provide or can provide, at least in part, the described functionality of messaging server 510 or one or more components therein. In addition, I/O interface(s) 518 can enable, at least, networked connectivity; as an example, I/O interface(s) 518 can receive data from network database 230. Moreover, in an aspect, I/O interface(s) 518 can be part of interface 235. To provide such functionality, processor(s) 514 can exploit bus 525 to exchange data or any other information amongst components within messaging server 510 and memory 522, or elements therein such as logic store 134. Bus 525 can be embodied in at least one of a memory bus, a system bus, an address bus, a message bus, or any other conduit, protocol, or mechanism for data or information exchange among components that execute a process or are part of execution of a process. The exchanged information can include at least one of code instructions, code structure(s), data structures, or the like. Processor(s) 514 also can execute code instructions (not shown) stored in memory 522 to implement or provide at least part of the described functionality of messaging server 510. Such code instructions can include program modules or software or firmware applications that implement specific tasks which can be accomplished through one or more of the methods described in the subject specification and that are associated, at least in part, with functionality of the various systems disclosed herein.

In one or more alternative or additional embodiment(s), processor(s) 514 can be distributed amongst one or more components of messaging server 510. In further one or more alternative or additional embodiments, one or more components of messaging server 510 can be implemented as software or firmware and can reside within a memory 522 as one or more sets of code instructions that, when executed by processor(s) 514, implement the one or more components and described functionality thereof.

Figure 6:
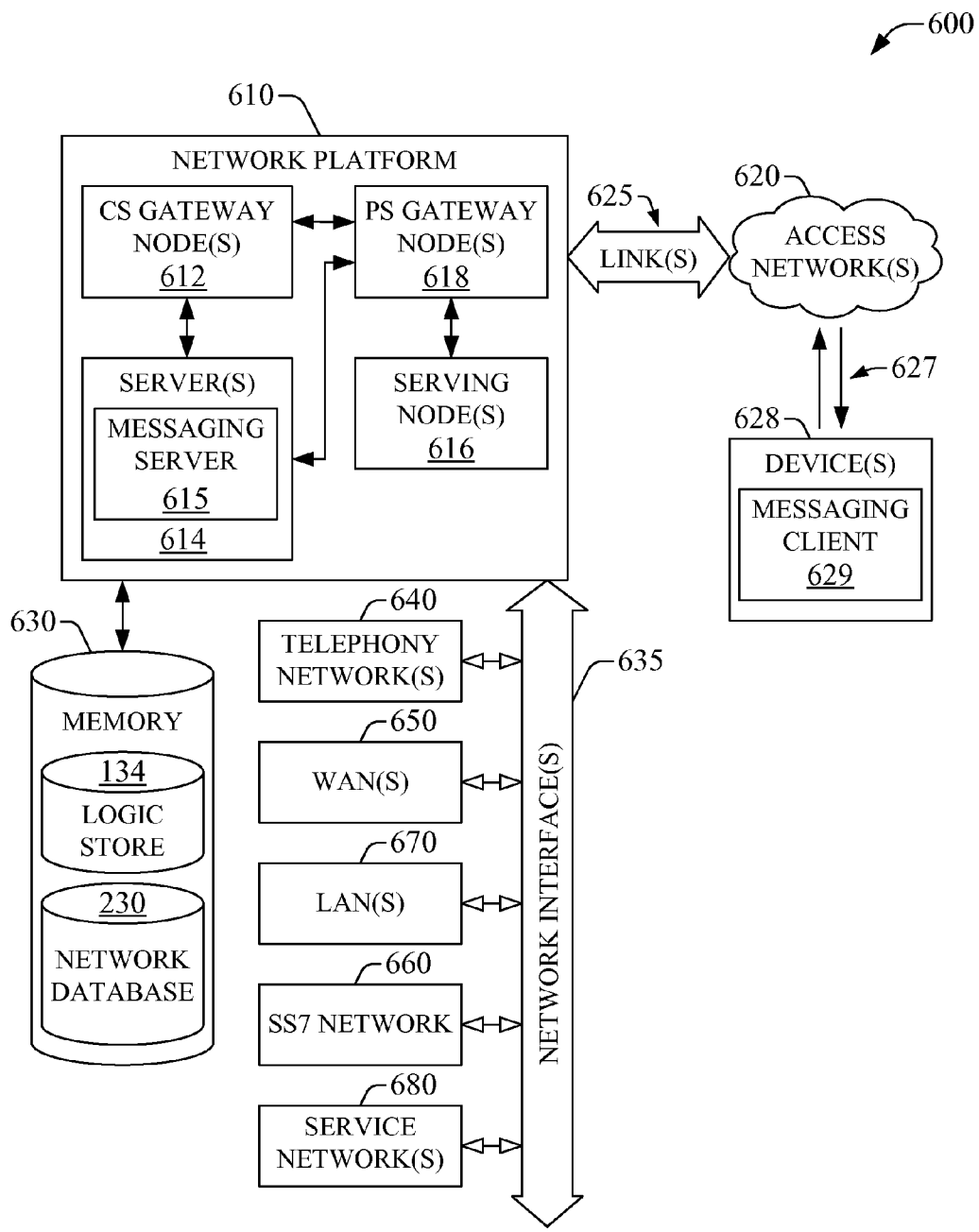
FIG. 6 presents a high-level block diagram of an example network environment in which aspects described herein can be implemented or exploited.

In order to provide additional context for the various embodiments of the subject disclosure, FIG. 6 presents a high-level block diagram of an example network environment in which aspects described herein can be implemented or exploited. Generally, network platform 610 can include one or more components, e.g., node(s), gateway node(s), interface(s), server(s), or platform(s) that enable both packet-switched (PS) (e.g., internet protocol (IP), frame relay, asynchronous transfer mode (ATM)) and circuit-switched (CS) traffic (e.g., voice and data) and control generation for networked communication, wireless or otherwise. In an aspect of the subject disclosure, a functional element within a PS domain of network platform 610 can be employed to effect communication within a messaging service that exploits at least one of a messaging client or messaging server as described herein; PS gateway node(s) 618 can embody at least part the PS domain. In an example scenario, the functional element within the PS domain can enable exchange of MS communications in one or more of the following transport protocols: MMS protocol, SIMPLE, XMPP, or IMPS protocol. With respect to CS communication, network platform 610 includes CS gateway node(s) 612, which can interface CS traffic received from legacy networks like telephony network(s) 640 (e.g., public switched telephone network (PSTN), or public land mobile network (PLMN)) or a SS7 network 660. CS gateway node(s) 612 also can enable exchange of MS communications in SMS protocol. In addition, CS gateway node(s) 612 can authorize and authenticate traffic (e.g., voice) arising from such networks. Moreover, CS gateway node(s) 612 can access mobility, or roaming, data generated through SS7 network 660; for instance, mobility data stored in a VLR, which can reside in memory 630. Furthermore, CS gateway node(s) 612 can interface CS-based traffic or signaling with PS gateway node(s) 618. As an example, in a 3GPP UMTS network, CS gateway node(s) 612 can be embodied, at least in part, in gateway GPRS support node(s) (GGSN).

In the subject disclosure, in addition to receiving and processing CS-switched traffic and signaling, PS gateway node(s) 618 can authorize and authenticate PS-based data sessions with device(s) 628, mobile or otherwise, served through access network(s) 620 via link(s) 625, wireless or wired (e.g., reference links), or wireless link(s) 627. Data sessions can include traffic exchange with networks external to network platform 610, such as wide area network(s) (WAN(s)) 650 or service network(s) 680; local area network(s) (LAN(s)) 670 also can be interfaced with network platform 610 through PS gateway node(s) 618. Network interface(s) 635 enable the traffic exchange; such interface(s) can include conventional wired or wireless links, or reference links specific to each of the external network(s) that interface with the PS domain, e.g., PS gateway node(s) 618, of network platform. In an aspect, packet-switched gateway node(s) 618 can generate packet data protocol (PDP) contexts when a data session is established. To at least that end, in an aspect, PS gateway node(s) 618 can include a tunnel interface (e.g., tunnel termination gateway (TTG) in 3GPP UMTS network(s) (not shown)) which can facilitate packetized communication with disparate wireless network(s), which can be part of access network(s) 620 and can include Wi-Fi networks, femtocell network(s), macrocellular network(s) and associated radio access network(s) (RAN(s)) based on various radio technology generations, etc. It should be further appreciated that packetized communication can include multiple flows that can be generated through server(s) 614, such as management server(s) (e.g., a provisioning server) or application server(s). It is to be noted that in 3GPP UMTS network(s), PS gateway node(s) 618 (e.g., GGSN) and tunnel interface (e.g., TTG) comprise a packet data gateway (PDG).

In network environment 600, network platform 610 also includes serving node(s) 616 that convey the various packetized flows of data streams, such as MS communication(s) directed to messaging client 629, which can reside within device(s) 628) and operates in accordance with aspects of any messaging client described herein (e.g., 110, 210, or 310), and that are received through PS gateway node(s) 618 from server(s) 614, e.g., messaging server 615. In turn, server(s) 614 can receive the MS communication(s) from disparate device(s) (not shown). As an example, in a 3GPP UMTS network, serving node(s) 616 can be embodied in serving GPRS support node(s) (SGSN). As another example, in a 3GPP LTE network, service node(s) 616 can be embodied in a MME.

Server(s) 614 can operate in various layers of network platform 610, such as Operations Support Systems (OSS), Business Support Systems (BSS), or network sub-systems such as IMS core network, and can execute numerous applications, which can include consumer-oriented application(s), such as messaging services, location services, online gaming, wireless banking, or system-oriented applications, e.g., wireless device management, scheduling or queuing of network traffic, or the like. Such applications, consumer- or system-oriented can generate sets of packetized data streams or flows, and manage (e.g., schedule, queue, format . . . ) such flows. Such application(s), for example can include add-on features to standard services provided by mobile network platform 610. Server(s) 614 can include messaging server 615, which operates in substantially the same manner as any messaging server described in the subject disclosure. Data streams (e.g., message 122) generated by server(s) 614, can be conveyed to PS gateway node(s) 618 for authorization/authentication and initiation of a data session, and to serving node(s) 616 for communication to device(s) 628 thereafter.

Server(s) 614 also can also effect security (e.g., implement one or more firewalls) of network platform 610 to ensure network's operation and data integrity in addition to authorization and authentication procedures that CS gateway node(s) 612 and PS gateway node(s) 618 can enact. In addition, server(s) 614 can implement timing protocols (e.g., Network Time Protocol (NTP)) that supply timing framework(s) for various operation(s) of network platform 610. Moreover, server(s) 614 can provision services from external network (s), e.g., WAN 650, IMS core network which can be part of service network(s) 680, or Global Positioning System (GPS) network(s) (not shown). Server(s) 614 can include one or more processors (not shown) configured to provide at least in part the functionality of network platform 610. To that end, the one or more processor can execute code instructions (not shown) stored in memory 630, for example.

In example network environment 600, memory 630 can store information related to operation of network platform 610. Information can include content(s), such as subscriber-generated content or from various other sources; subscriber account(s) and associated credential(s); pricing schemes, e.g., promotional rates, flat-rate programs, couponing campaigns; technical specification(s) of served WDMFs; and so forth. Memory 630 can also store information from at least one of telephony network(s) 640, WAN(s) 650, LAN(s) 670, SS7 network 660, or service network(s) 680. Memory 630 also can include logic store 634 and network database 230. While illustrated as a single entity, memory 630 can be distributed amongst one or more of the described external networks, server(s) 614, or other functional elements of network platform 610.

In view of the example system(s) described above, example method(s) that can be implemented in accordance with the disclosed subject matter can be better appreciated with reference to flowcharts in FIGS. 7-10. For purposes of simplicity of explanation, methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more methods disclosed herein could alternatively be represented as a series of interrelated states or events, such as in a state diagram. Moreover, interaction diagram(s) or call flow(s) may represent one or more methods described herein in accordance with the disclosed subject matter when disparate entities enact disparate portions of the one or more methods. Furthermore, not all illustrated acts may be required to implement a described method in accordance with the subject specification. Further yet, two or more of the disclosed methods can be implemented in combination, to accomplish one or more features or advantages described herein.

Methods disclosed throughout the subject specification and annexed drawings are capable of being stored on an article of manufacture to facilitate transporting and transferring such methods to computers for execution, and thus implementation, by a processor or for storage in a memory. In an aspect, one or more processors, such as processor(s) that enact the method(s) described herein, can be employed to execute code instructions retained in a memory, or any computer- or machine-readable medium, to implement method(s) described herein; the code instructions provide a computer- or machine-executable framework to enact the method(s) described herein.

Figure 7:
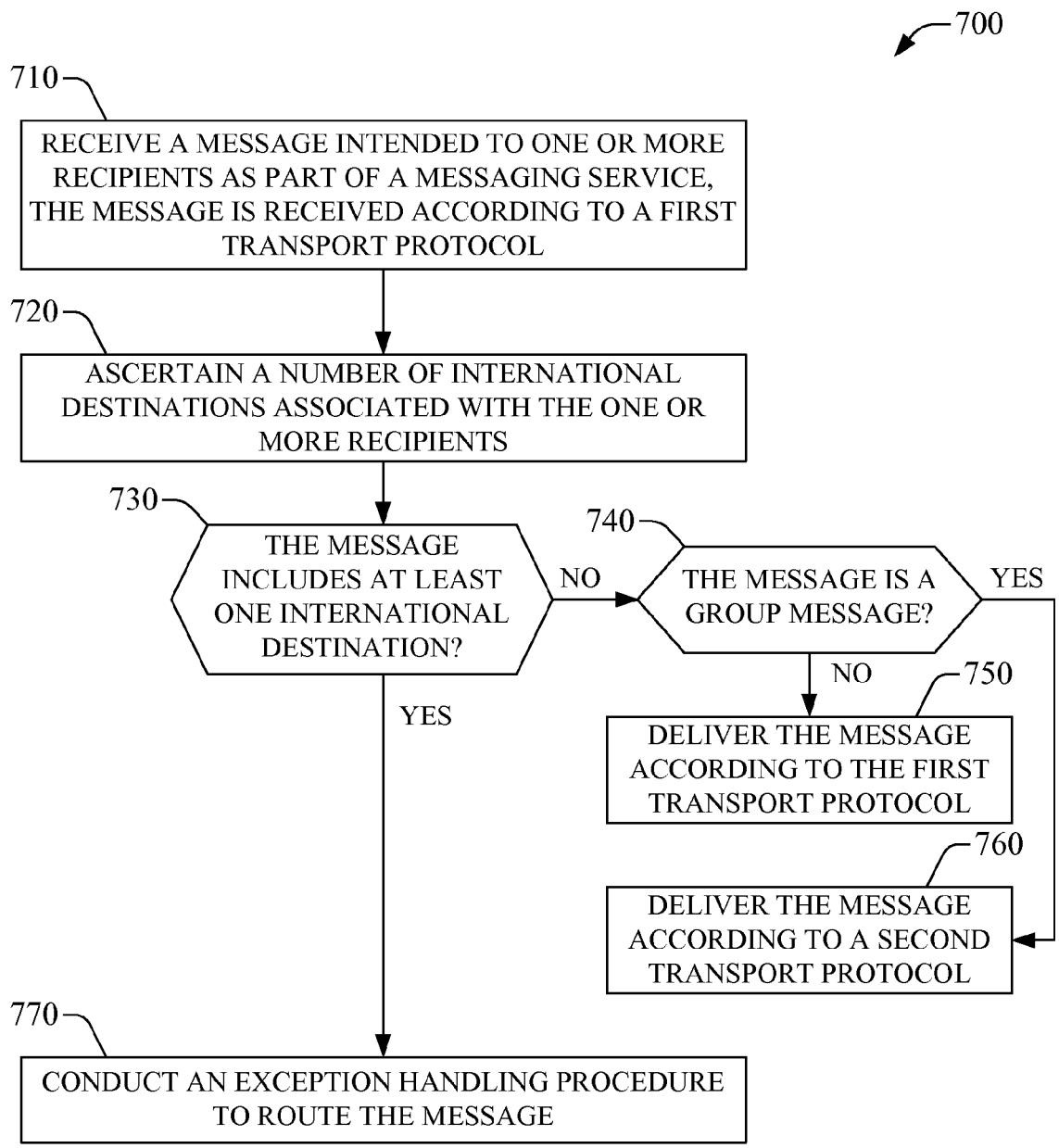
FIG. 7 is a flowchart of an example method for routing a communication within a messaging service according to aspects described in the subject disclosure.

FIG. 7 is a flowchart of an example method 700 for routing a group communication, or group message, within a messaging service according to aspects described in the subject disclosure. The subject example method can be implemented by a messaging client component, e.g., 210, or components therein, with the functionality described herein. In addition or in the alternative, a network component, such as a messaging server, e.g., 120, a gateway component, or application server (s), can effect the subject example method 700. One or more processors also can be perform the subject example method. In an aspect, the one or more processors can provide, at least in part, the functionality of the messaging component, or component(s) therein, or the network component. In another aspect, the one or more processors can execute the messaging client component or the network component when such components are embodied in a set of code instructions that are part of a software or a firmware application.

At act 710, a message intended to one or more recipients is received as part of a messaging service, the message is received according to a first transport protocol, which can be determined based on the contents of the message. For example, if the message content includes media, the first transport protocol can be MMS protocol whereas if the message content only includes text, the first transport protocol can be SMS. Each recipient is operationally linked to a device that can receive and process content conveyed as part of the message, or messaging service (MS) communication, and is identified through an address, as described supra.

At act 720, a number of international destinations (e.g., addresses) associated with the one or more recipients is ascertained. A component such as router component 118 can implement the subject act. In an aspect, ascertaining an international destination (e.g., address) includes identifying at least one address linked to the one or more recipients that, according to a dialing plan, represents a device number that begins with "011k" or with "+k", wherein k is an alphanumeric digit different than "1". In addition, ascertaining the number of international destinations can include generating and retaining (e.g., in memory 130) at least one of a logical variable for each destination (e.g. an address) that identifies such destination as an international destination, or a single logical variable associated with the group message that tags such message as containing an international destination.

At act 730, it is probed if the group message includes at least one international destination. The probing act can include polling a memory, e.g., 130, to determine a value of logical variable(s) that identify a group message as containing an international destination. If the message includes at least one international destination, at act 770, an exception handling procedure is conducted to route the group message. A negative outcome of act 730 leads to act 740, in which it is probed if the message is a group message. In the negative case, e.g., the message is intended to one recipient, at act 750, the message is delivered according to the first transport protocol. In the alternative, if the message is a group message, act 760, the message is delivered according to a second transport protocol, which can be a predetermined transport protocol provisioned for communication of group message(s) in a messaging service. As an example, the second transport protocol can be MMS protocol. A network operator or telecommunication carrier can provision the predetermined transport protocol based on network infrastructure capabilities and suitable business metrics, e.g., mobile devices marketed to network subscribers. In an aspect, the second transport protocol can be the same protocol as the first transport protocol for delivery of a non-group message, e.g., a point-to-point message.

Figure 8:
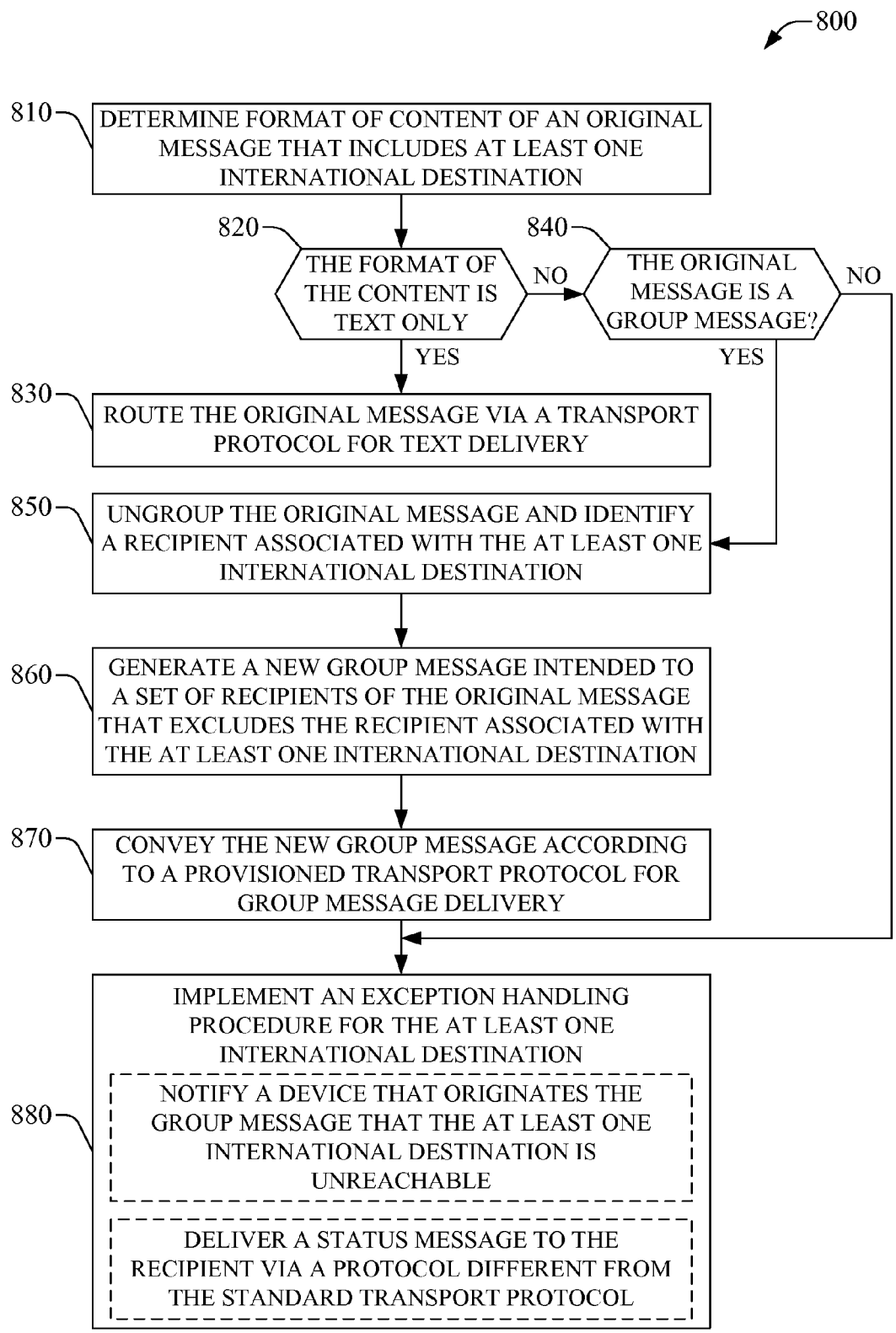
FIGS. 8-10 display flowcharts of example methods for conducting an exception handling procedure to route a message that includes an international destination according to aspects disclosed herein.

FIG. 8 displays a flowchart of an example method 800 for conducting an exception handling procedure to route a group message according to aspects disclosed herein; the subject example method can be effected as part of act 770. Component(s) or processor(s) that enact example method 700 can implement the subject example method 800. At act 810, format of content (e.g., 108) of an original group message that includes at least one international destination is determined. In an aspect, the original message is the message of act 610 and thus can be a point-to-point message, e.g., intended for one recipient or a group message, e.g., intended for a plurality of two or more recipients. A component, such as format component 114, that is part of a messaging client component can perform the subject act.

At act 820, it is probed if the format of the content in the original group message is text-only. In the affirmative case, at act 830, the group message is routed via a transport protocol for text delivery. In an aspect, such transport protocol can be most any or any highly interoperable protocol amongst domestic and international network operators; for instance, SMS protocol. The transport protocol for text delivery can be selected based on routing logic retained in a memory functionally coupled to component(s) or processor(s) that enact the subject example method 800. In the negative case, if the group message includes content other than text, such as media (e.g., picture(s), music or video clip(s) . . . ), hyperlink(s) to web-based content, etc., flow is directed to act 840, in which it is evaluated if the original message is a group message, e.g., a message intended for a plurality of two or more recipients.

At act 850, in which the original group message is ungrouped and a recipient associated with the at least one international destination is identified. In an aspect, router component 118 can implement act 850. At act 860, a new group message intended to a set of recipients of the original group message that excludes the recipient associated with the at least one international destination. In an example scenario, format component 114 can generate the new group message. At act 870, the new group message is conveyed according to a provisioned transport protocol for group message delivery. A network operator that administers a messaging service in which the original message is supplied can provision the transport protocol. As an example, the provisioned transport protocol can be MMS protocol; however, other transport protocols such as IMPS protocol, SIMPLE, or XMPP can be employed for group message delivery.

At act 880, an exception handling procedure is implemented for the at least one international destination. The exception handling procedure can include aspects described supra, such as notifying, e.g., through delivery of signaling (e.g., 124 or 324), a device that originates the group message that the at least one international destination is unreachable or delivering a status message to the recipient via a transport protocol different from the standard transport protocol for group message delivery.

Figure 9:
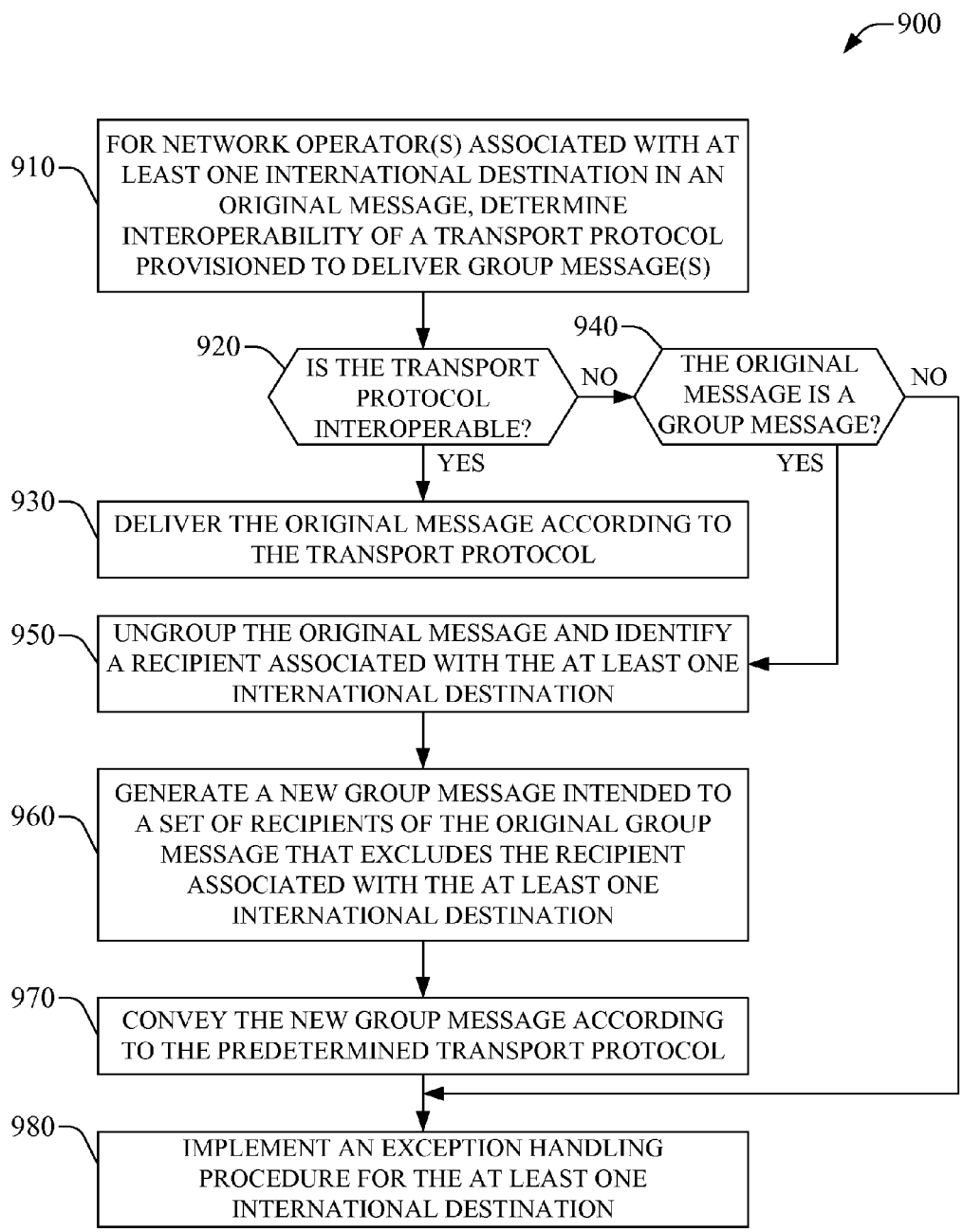

FIG. 9 is a flowchart of an example method 900 for conducting an exception handling procedure to route a group message according to aspects disclosed herein. The subject example method can be effected as part of act 770. In addition, in an aspect, the subject example method can be implemented in conjunction with example method 700. Component(s) or processor(s) that enact example method 700 can implement the subject example method 900.

At act 910, for network operator(s) associated with at least one international destination in an original group message, interoperability of a transport protocol provisioned to deliver group message(s) is determined. In an aspect, the original message is the message of act 610 and thus can be a point-to-point message, e.g., intended for one recipient, or a group message, e.g., intended for a plurality of two or more recipients. The transport protocol can be the first transport protocol of act 610, and can be provisioned by a network operator platform or component(s) therein. As an example, the transport protocol can be MMS protocol; however, as described supra, other transport protocols can embody the predetermined transport protocol. As described supra (e.g., see FIG. 2), determining interoperability of the transport protocol can be based in part on at least one of accessing data on network interoperability available to a network operator that administer a messaging service that serves the original group message, or aggregating the data on interoperability into actionable information, such as report(s) that tags one or more transport protocols as interoperable or non-interoperable.

At act 920, it is probed if the transport protocol is interoperable. The probing can include polling actionable information on network interoperability. In the affirmative case, at act 930, the original message is delivered according to the transport protocol. In the negative case, flow is directed to act 940, in which it is evaluated if the original message is a group message. In the affirmative case, flow is directed to act 950. Conversely, flow is directed to act 980. At act 950, in which the original group message is ungrouped and a recipient associated with the at least one international destination identified. At act 960, a new group message intended to a set of recipients of the original group message that excludes the recipient associated with the at least one international destination is generated. At act 970, the new group message is conveyed according to the transport protocol. At act 980, an exception handling procedure is implemented for the at least one international destination is implemented; the subject act is substantially the same as act 780.

Figure 10:
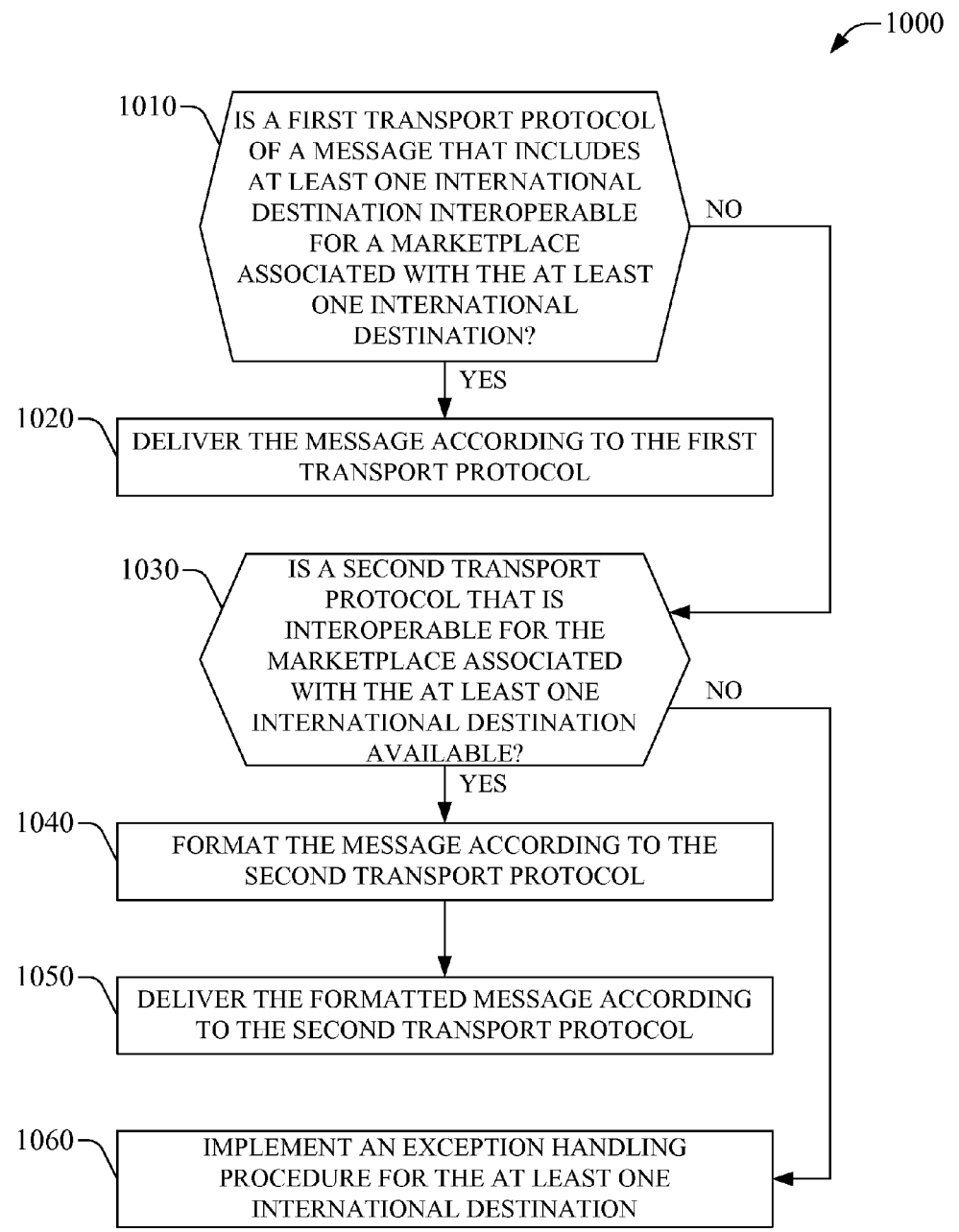

FIG. 10 presents a flowchart of an example method 1000 for conducting an exception handling procedure to route a message that includes at least one international destination according to aspects disclosed herein; the subject example method can be effected as part of act 670. The subject example method can be enacted as an alternative to methods 800 or 1000, or in conjunction therewith. Component(s) or processor(s) that enact example method 1000 can implement the subject example method 1000. At act 1010, it is tested if a first transport protocol of a message that includes at least one international destination is interoperable. In an aspect, the first transport protocol can be the transport protocol of act 610. If outcome of act 1010 is affirmative, then at act 1020 the message is delivered according to the first transport protocol. But if the outcome of act 1020 is negative, then flow is directed to act 1030, in which it is probed if a second transport protocol, or alternative transport protocol, that is interoperable for a marketplace associated with the at least one international destination is available. As discussed supra, determining interoperability of the transport protocol can be based in part on at least one of accessing data on network interoperability available to a network operator that administer a messaging service that serves the original group message, or aggregating the data on interoperability into actionable information.

A positive outcome of act 1030 leads to act 1040, in which the message is formatted according to the second transport protocol, or alternative transport protocol. As described supra, formatting the message can be carried out automatically by a component within a messaging client component, e.g., 210, or a messaging server, e.g., 320; in an aspect, the component can be format component 114. At act 1050, the message is delivered according to the second protocol. However, a negative outcome of act 1030 leads to act 1060, in which an exception handling procedure for the at least one international destination is implemented; the subject act is substantially the same as act 880 or 980.

Aspects, features, or advantages described in the subject specification can be exploited in substantially any wireless communication technology. For instance, 4G technologies, Wi-Fi, WiMAX, Enhanced GPRS, 3GPP LTE, 3GPP2 UMB, 3GPP UMTS, HSPA, HSDPA, HSUPA, GERAN, UTRAN, LTE Advanced. Additionally, substantially all aspects of the subject innovation as disclosed in the subject specification can be exploited in legacy telecommunication technologies; e.g., GSM. In addition, mobile as well non-mobile networks (e.g., internet, data service network such as IPTV) can exploit aspects or features described herein.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Various aspects or features described herein can be implemented as a method, apparatus, or article of manufacture using standard programming and/or engineering techniques. In addition, various aspects disclosed in the subject specification can also be implemented through program modules stored in a memory and executed by a processor, or other combination of hardware and software, or hardware and firmware. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical discs (e.g., compact disc (CD), digital versatile disc (DVD), blu-ray disc (BD) . . . ), smart cards, and flash memory devices (e.g., card, stick, key drive . . . ).

What has been described above includes examples of systems and methods that provide advantages of the subject innovation. It is, of course, not possible to describe every conceivable combination of components or methodologies for purposes of describing the subject innovation, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:
receiving, by a system including a processor, a messaging service communication addressed to at least one recipient, wherein the messaging service communication is received according to a first transport protocol;
based in part on an address conveyed in the messaging service communication, determining, by the system, a number of international destinations associated with the at least one recipient;
in response to the number of international destinations being determined to be zero:
delivering, by the system, the messaging service communication according to the first transport protocol in response to determining the messaging service communication is addressed to at least two recipients; and
delivering, by the system, the messaging service communications according to a second transport protocol in response to determining the messaging service communication is addressed to one recipient; and
in response to the number of international destinations being determined to be at least one, initiating, by the system, an exception handling procedure to route the messaging service communication, wherein the exception handling procedure comprises:
determining, by the system, a format of content of the messaging service communication; and
in response to the format of content being text-only, initiating, by the system, routing the messaging service communication via a transport protocol for text delivery.

2. The method of claim 1, further comprising:
for a network operator device associated with an international destination of the number of international destinations, determining, by the system, an interoperability of the first transport protocol with the network operator device; and
initiating, by the system, delivery of the messaging service communication according to the first transport protocol to the network operator device in response to the first transport protocol being determined to be interoperable.

3. The method of claim 1, further comprising, in response to the format of content being determined not to be text-only, determining, by the system, whether the messaging service communication is addressed to the at least two recipients.

4. The method of claim 3, wherein the messaging service communication is a first messaging service communication, and further comprising:
in response to the first messaging service communication being determined to be addressed to the at least two recipients:
ungrouping, by the system, the first messaging service communication;
identifying, by the system, a recipient associated with an international destination of the number of international destinations;
generating, by the system, a second messaging service communication addressed to a set of recipients of the first messaging service communication that excludes the recipient associated with the international destination; and
initiating, by the system, conveying the second messaging service communication according to a provisioned transport protocol for delivery of messaging service communications addressed to a plurality of recipients.

5. The method of claim 3, further comprising, in response to the messaging service communication being determined not to be addressed to the at least two recipients, initiating, by the system, another exception handling procedure for the international destination.

6. The method of claim 1, wherein the exception handling procedure further comprises:
initiating delivery of the messaging service communication according to the first transport protocol in response to determining the first transport protocol is interoperable with an international destination of the number of international destinations.

7. The method of claim 6, further comprising:
in response to determining the first transport protocol is not interoperable with the international destination, determining, by the system, that an alternative transport protocol that is interoperable with international destination is available; and
in response to the alternative transport protocol being determined to be available:
formatting, by the system, the messaging service communication according to the alternative transport protocol; and
initiating, by the system, delivery of the messaging service communication formatted according to the alternative transport protocol, which is a multimedia messaging service protocol.

8. The method of claim 7, further comprising, in response to the alternative transport protocol being determined to be unavailable, initiating, by the system, another exception handling procedure for the international destination.

9. The method of claim 1, wherein the determining the number of international destinations includes identifying a recipient address that, according to a dialing plan, represents a device number that begins with international dialing.

10. The method of claim 1, wherein the first and second transport protocols are a text message protocol.

11. The method of claim 4, wherein the provisioned transport protocol is a multimedia messaging service protocol.

12. A system, comprising:
a memory to store computer-executable instructions;
a processor, communicatively coupled to the memory, that facilitates execution of the computer-executable instructs to perform operations, comprising:
receiving, according to a first transport protocol, an messaging service communication addressed to at least one recipient;
determining a number of international destinations associated with the at least one recipient;
in response to the number of international destinations being determined to be zero:
initiating delivery of the messaging service communication according to the first transport protocol in response to the messaging service communication being determined to be addressed to at least two recipients; and
initiating delivery of the messaging service communications according to a second transport protocol in response to the messaging service communication being determined to be addressed to one recipient; and
in response to the number of international destinations being determined to be non-zero, initiating an exception handling procedure to route the messaging service communication, wherein the exception handling procedure comprises:
  determining, by the system, a format of content of the messaging service communication; and
  in response to the format of content being text-only, initiating, by the system, routing the messaging service communication via a transport protocol for text delivery.

13. The system of claim 12, wherein the exception handling procedure further comprises:
  establishing interoperability of the first transport protocol with an international destination of the number of international destinations as part of the exception handling procedure; and
  in response to the first transport protocol being established to be interoperable with the international destination, initiating delivery of the messaging service communication via the first transport protocol as part of the exception handling procedure.

14. The system of claim 13, wherein the exception handling procedure further comprises:
  in response to the format of content being determined not to be text-only, determining whether the messaging service communication is addressed to the at least two recipients.

15. The system of claim 14, wherein the messaging service communication is a first messaging service communication and the exception handling procedure further comprises:
  in response to the messaging service communication being addressed to the at least two recipients:
    ungrouping the first messaging service communication;
    identifying a recipient associated with an international destination of the number of international destinations;
    creating a second messaging service communication addressed to a set of recipients of the first messaging service communication that excludes the recipient associated with the international destination; and
    sending the second messaging service communication according to a provisioned transport protocol for delivery of messaging service communications addressed to a plurality of recipients.

16. The system of claim 15, wherein the exception handling procedure further comprises:
  in response to the first messaging service communication being determined not to be addressed to the at least two recipients, initiating another exception handling procedure for the international destination.

17. The system of claim 13, wherein the exception handling procedure further comprises:
  initiating delivery, to a sender of the messaging system communication, a remediation message comprising a recommendation for an alternative communication protocol to employ to send the messaging system communication to an international destination of the number of international destinations.

18. A non-transitory computer-readable medium having instructions stored thereon that, in response to execution, cause a device including a processor to perform operations comprising:
  receiving an messaging service communication addressed to at least one recipient, wherein the messaging service communication is received according to a first transport protocol;
  determining a number of international destinations associated with the at least one recipient based in part on an address conveyed in the messaging service communication;
  in response to determining that the number of international destinations is null:
    delivering the messaging service communication according to the first transport protocol in response to the messaging service communication being determined to be addressed to at least two recipients; and
    delivering the messaging service communications according to a second transport protocol in response the messaging service communication being determined to be addressed to one recipient; and
  initiating an exception handling procedure to route the messaging service communication in response to determining that the number of international destinations is not null, wherein the exception handling procedure comprises:
    determining, by the system, a format of content of the messaging service communication; and
    in response to the format of content being text-only, initiating, by the system, routing the messaging service communication via a transport protocol for text delivery.

* * * * *